Figure 1:
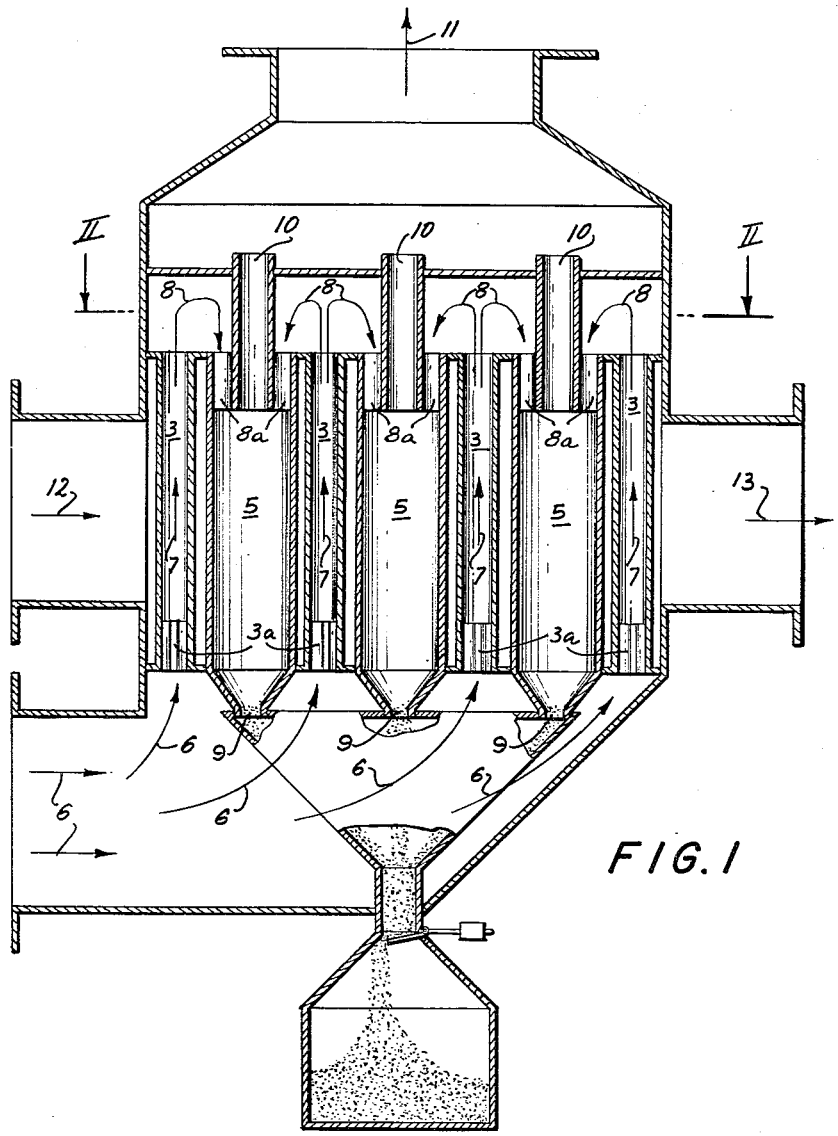

Sept. 4, 1956  R. KEMMETMÜLLER  2,761,526
HEAT EXCHANGER
Filed Aug. 14, 1953  2 Sheets-Sheet 1

INVENTOR:
Roland Kemmetmuller
BY:
Michael S. Striker
agt.

United States Patent Office 2,761,526
Patented Sept. 4, 1956

2,761,526

HEAT EXCHANGER

Roland Kemmetmüller, Vienna, Austria, assignor to Waagner-Biro Aktiengesellschaft, Vienna, Austria, a firm of Austria Application August 14, 1953, Serial No. 374,405

Claims priority, application Austria August 19, 1952

7 Claims. (Cl. 183—32)

The invention relates to a heat exchanger with tubes flowed through internally and subjected to a substantially transverse flow on the outside, which tubes are passed through internally by a rotary or twisting current and guide profiles are provided on the outside of the tubes or between these tubes, which guide profiles enforce a practically non-turbulent flow around the tubes (see copending U. S. patent application, Serial No. 299,122, filed July 16, 1952. Such heat exchangers have a large heat exchange capacity because owing to its rotary or twisting flow the medium passed through internally delivers large quantities of heat to the tubes. That large heat quantity is carried off by another heat exchange medium, which flows around the outside of these tubes quickly and practically without turbulence. According to the invention the heat exchange capacity and efficiency of such plants are further increased thereby that the guide profiles for the medium passed over the outside of the tubes are hollow internally and are used for the conduction therethrough of media to be treated thermally.

The subject of the invention is shown in some embodiments by way of example in the drawing.

Figure 2:
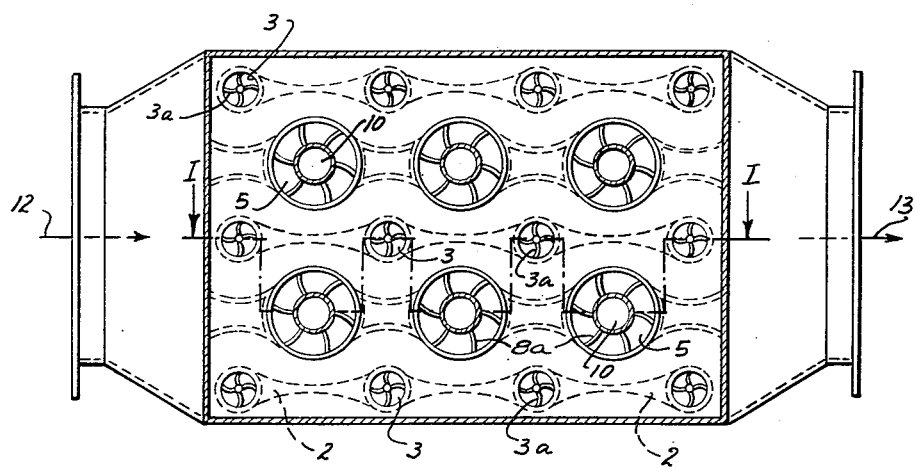
Figure 3:
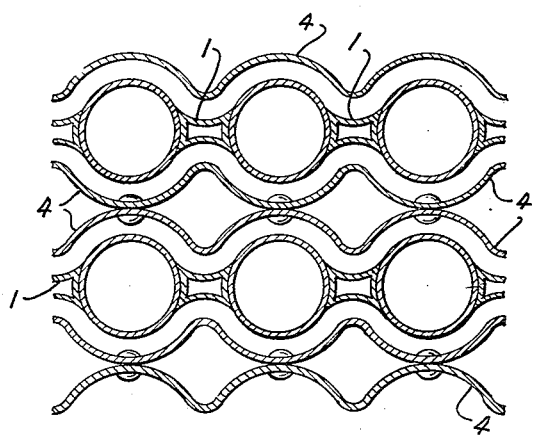

Fig. 1 shows a plant according to the invention in a partially sectional elevation. Fig. 2 is a sectional view taken along line II—II of Fig. 1. Fig. 3 is a top plan view of another embodiment of the subject of the invention.

In the plant according to Figs. 1 and 2, numerals 5 designate the heat exchange tubes proper, which in this case are provided as centrifugal separators. Crude gas contaminated with dust enters the plant in the direction of arrows 6 and first flows according to arrows 7 through tubes 3. The crude gas further passes according to arrows 8 through guide devices 8a into heat exchange tubes 5 of centrifugal separator type. The dust is separated at 9, the pure gas escapes through the pure-gas lines 10 in the direction of arrow 11. The medium to be treated thermally, e. g. cold air, enters the plant according to arrow 12 and leaves the plant as hot air according to arrow 13.

From the top plan of Fig. 2 it is apparent that the tubes 3 carry profile members 2. This means that the air to be treated flows through the plant practically without turbulence. This involves a heat exchange not only at the tubes 5, of centrifugal separator type, but also at tubes 3. This means that these tubes 3 act advantageously at the same time as heat exchange tubes and, in conjunction with the profile pieces 2, as guides for the air passing through transversely.

According to Fig. 3 the guide profiles 1, 4, serving for the conduction of media to be treated thermally, are formed of correspondingly bent metal sheets. In other respects the function is exactly as has been disclosed with reference to Figs. 1 and 2.

It may be emphasized that the internally hollow guide profiles 1, 2, 3, 4 may be passed through by a straight and/or by a twisting current. For such twisting current it is only necessary, e. g. to provide at the entrance to the tubes 3 a guide device 3a. Finally it is apparent from the top plan views of Figs. 2 and 3 that the tubes 5 and the guide profiles 1, 2, 3, 4 form continuous, gas-, liquid- and dust-tight walls so that all these walls formed within a plant provide flow paths for the entire medium flowing through transversely, which flow paths are strictly separated from each other and which are flowed through by said medium without form resistance (without turbulence). In this manner such multicellular plants may be constructed for large heat exchange capacities and high efficiency.

The invention is not restricted to the illustrative embodiments shown. Obviously it is not necessary that all guide profiles 1, 2, 3, 4 are internally hollow. Under certain circumstances it may be sufficient to have the medium to be treated thermally flow only through tubes 3. On the other hand, however, the profile pieces 2 may also be hollow internally, for the same purpose. The wall surfaces of the heat exchanger may be plain or carry longitudinal or transverse ribs. The transversely flowing medium is preferably guided within a box.

I claim:

1. A heat exchange device, comprising, in combination, a plurality of tube members through which a first fluid medium is adapted to flow; a flow directing means for producing a rotary flow of the first fluid medium through said tube members in contact with the inner surfaces thereof; and guide means arranged between said tube members defining therewith channels adjacent the walls of said tube members through which channels a second fluid medium is adapted to flow with a minimum of resistance transversely to the axes of said tube members and in contact with the outer surfaces thereof, at least part of said guide means being hollow and forming conduit means in communication with said tube members, whereby heat exchange may occur between the first and second fluid media.

2. A heat exchange device, comprising, in combination, a plurality of tube members through which a first fluid medium is adapted to flow; flow directing means for producing a rotary flow of the first fluid medium through said tube members in contact with the inner surfaces thereof; and sinuous guide means arranged between said tube members defining therewith channels adjacent the walls of said tube members through which channels a second fluid medium is adapted to flow with a minimum of resistance transversely to the axes of said tube members and in contact with the outer surfaces thereof, at least part of said guide means being hollow and forming conduit means in communication with said tube members, whereby heat exchange may occur between the first and second fluid media.

3. A heat exchange device, comprising, in combination, a plurality of tube members through which a first fluid medium is adapted to flow; a flow directing means for producing a rotary flow of the first fluid medium through said tube members in contact with the inner surfaces thereof; and sinuous sheet metal guide means arranged between said tube members defining therewith channels adjacent the walls of said tube members through which channels a second fluid medium is adapted to flow with a minimum of resistance transversely to the axes of said tube members and in contact with the outer surfaces thereof, at least part of said guide means being hollow and forming conduit means in communication with said tube members, whereby heat exchange may occur between the first and second fluid media.

4. A heat exchange device, comprising, in combination, a plurality of tube members through which a first fluid medium is adapted to flow; flow directing means for producing a rotary flow of the first fluid medium through said tube members in contact with the inner surfaces thereof; and tubular guide means arranged between said tube members defining therewith channels adjacent the walls of said tube members through which channels a second fluid medium is adapted to flow with a minimum of resistance transversely to the axes of said tube members and in contact with the outer surfaces thereof, the interior of said tubular guide means being in communication with said tube members, whereby heat exchange may occur between the first and second fluid media.

5. A heat exchange device, comprising, in combination a set of first tubular members through which a first fluid medium may flow; a set of second tubular members in communication with said first tubular members and arranged with respect thereto so that the first fluid medium may flow through said second tubular members after flowing through said first tubular members; flow-directing means for producing a rotary flow of the first fluid medium in at least one of said sets of tubular members; and guide means arranged between the tubular members of one of said sets of tubular members defining therewith channels adjacent the walls of the tubular members of said one set of tubular members through which channels a second fluid medium may flow with a minimum of resistance transversely to the axes of the tubular members of said one set of tubular members and in contact with the outer surfaces thereof, the tubular members of the other of said sets of tubular members being arranged within said guide means, whereby heat exchange may occur between the first and second fluid media.

6. A heat exchange device, comprising, in combination, a set of first tubular members through which a first fluid medium may flow; a set of second tubular members in combination with said first tubular members and arranged with respect thereto so that the first fluid medium may flow through said second tubular members; flow-directing means for producing a rotary flow of the first fluid medium in said tubular members; and guide means arranged between the tubular members of one of said sets of tubular members defining therewith channels adjacent the walls of the tubular members of said one set of tubular members through which channels a second fluid medium may flow with a minimum of resistance transversely to the axes of the tubular members of said one set of tubular members and in contact with the outer surfaces thereof, the tubular members of the other of said sets of tubular members being arranged within said guide means, whereby heat exchange may occur between the first and second fluid media.

7. In a combined centrifugal separator and heat exchanger device, in combination, a plurality of tube members through which a first fluid medium is adapted to flow, said tube members forming parts of the centrifugal separator and having smooth inner surfaces; flow directing means for producing a rotary flow of the first fluid medium through said tube members in contact with the inner surfaces thereof; and guide means arranged between said tube members defining therewith channels adjacent the walls of said tube members through which channels a second fluid medium is adapted to flow with a minimum of resistance transversely to the axes of said tube members and in contact with the outer surfaces thereof, at least part of said guide means being hollow and forming conduit means in communication with said tube members, whereby heat exchange may occur between the first and second fluid media.

References Cited in the file of this patent

UNITED STATES PATENTS

| | | |
|---|---|---|
| 983,914 | Lovekin | Feb. 14, 1911 |
| 1,775,103 | Hume | Sept. 9, 1930 |
| 1,916,337 | Schmidt | July 4, 1933 |
| 2,327,691 | Allardice | Aug. 24, 1943 |
| 2,355,621 | Brown | Aug. 15, 1944 |
| 2,417,661 | Rosales | Mar. 18, 1947 |

FOREIGN PATENTS

| | | |
|---|---|---|
| 166,907 | Switzerland | Apr. 16, 1934 |
| 336,755 | Great Britain | Oct. 23, 1930 |